(12) United States Patent
Siska

(10) Patent No.: US 7,181,595 B1
(45) Date of Patent: Feb. 20, 2007

(54) METHOD FOR DECODING COMPOSITE VLIW PACKETS UTILIZING A TREE STRUCTURE

(75) Inventor: Charles P. Siska, Costa Mesa, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 481 days.

(21) Appl. No.: 09/721,152

(22) Filed: Nov. 22, 2000

Related U.S. Application Data

(63) Continuation-in-part of application No. 09/569,891, filed on May 11, 2000.

(51) Int. Cl.
*G06F 9/30* (2006.01)

(52) U.S. Cl. .......................... 712/24; 712/208
(58) Field of Classification Search ............... 712/24, 712/208
See application file for complete search history.

(56) References Cited

U.S. PATENT DOCUMENTS

| | | | |
|---|---|---|---|
| 5,922,065 A * | 7/1999 | Hull et al. ................ | 712/24 |
| 6,457,173 B1 * | 9/2002 | Gupta et al. ............... | 717/149 |

OTHER PUBLICATIONS

Petrov, "Code Compaction and Parallelization for VLIW/DSP Chip Architectures," Jun. 1999, pp. 38-40.*
Aditya et al., "Automatic Design of VLIW and EPIC Instruction Formats," Apr. 2000, pp. 71-82.*

* cited by examiner

*Primary Examiner*—Eddie Chan
*Assistant Examiner*—David J. Huisman
(74) *Attorney, Agent, or Firm*—Farjami & Farjami LLP

(57) ABSTRACT

To decode a composite VLIW packet, assembly code is provided for the bit patterns corresponding to each individual instruction in the packet. The bit pattern for the template in the packet is then matched against a known template. The known template uniquely corresponds to a known syntax corresponding to one of a plurality of known syntaxes, where the plurality of known syntaxes are arranged as a plurality of first level nodes in a tree structure, where each of a plurality of second level nodes in said tree structure includes a combination of instruction types, and where each of a plurality of third level nodes in said tree structure includes an instruction type. The known syntax is then matched to a resolved packet syntax using the tree structure. The resolved packet syntax is then used to provide assembly code associated with the execution of the combination of instructions in the packet.

19 Claims, 7 Drawing Sheets

METHOD FOR DECODING COMPOSITE VLIW PACKETS UTILIZING A TREE STRUCTURE

The present application is a continuation-in-part of a co-pending application entitled "Method and System for Encoding a Composite VLIW Packet," Ser. No. 09/569,891, filed on May 11, 2000 and assigned to the assignee of the present application. The disclosure in that co-pending application is hereby incorporated fully by reference into the present application.

BACKGROUND OF THE INVENTION

1. Field of the Invention

The present invention is generally in the field of signal processors and central processing units. In particular, the invention is in the field of very long instruction word ("VLIW") processors.

2. Background Art

VLIW processors differ from the general conventional processors. One primary difference is that VLIW processors use very long instruction words which are, simply stated, a combination of instructions which are generally handled concurrently by the processor. A VLIW "packet" of instructions (also referred to as a "composite packet" in the present application) usually includes, in addition to the combination of instructions referred to above, other information which are needed for processing that particular combination of instructions. For example, each VLIW composite packet includes a template which specifies, among other things, the particular "instruction type" placed in each "instruction slot" of the composite packet. Examples of various instruction types are arithmetic instructions, logical instructions, branch instructions, or memory associated instructions. Each instruction type is usually assigned to one or two specific logic units for its execution (each such logic unit is appropriately called an "execution unit").

A VLIW packet typically contains a number of instructions whose execution can begin in the same clock cycle. Instructions in a VLIW packet whose execution can begin in the same clock cycle form a single "issue group." By definition, instructions belonging to a same issue group do not depend on the result of execution of other instructions in that same issue group. However, instructions in one issue group may depend on the result of execution of instructions in another issue group. The "length" of an issue group specifies how many instructions are in that issue group. For example, a particular issue group may have a length of two instructions. The template in a VLIW packet contains information as to which instructions in the VLIW packet belong to the same issue group. For example, in a certain VLIW processor there may be up to four issue groups in a VLIW packet. The template also contains information as to the length of each issue group.

Moreover, one or more instructions in a first VLIW packet may be "chained" to an issue group in a second VLIW packet. In other words, one or more instructions in the first VLIW packet may belong to an issue group in the second VLIW packet. Hence, the execution of the "chained" instruction (or instructions) will begin in the same clock cycle in which the execution of instructions in the issue group in the second VLIW packet begins. The template in the VLIW packet also contains information indicating which instruction (or instructions), if any, in the first VLIW packet is (or are) chained to an issue group in the second VLIW packet.

Information regarding the assigning of instructions to particular slots in a VLIW packet for execution in appropriate execution units, information as to the number and length of each issue group in the VLIW packet, and chaining information are among information which are contained in the template of the VLIW packet. The template in the VLIW processor may comprise a number of consecutive bits located next to each other or a number of bits that are spread throughout the VLIW packet.

A typical VLIW processor assembly language program contains assembly code for the instructions to be placed in a VLIW packet. Moreover, a typical VLIW processor assembly language program contains specific assembly code associated with execution of the instructions in the VLIW packet. Stated differently, a typical VLIW processor assembly language program contains not only the instructions to be executed by the processor, but assembly code containing information such as issue grouping and chaining of the instructions to be executed. From the assembly language code provided by the programmer, a VLIW packet must be encoded. Encoding involves determining an appropriate template for the VLIW packet and placing the template bits and the bits corresponding to each individual instruction in appropriate bit positions within the VLIW packet.

Present methods used for various generic processors cannot be easily and efficiently used to encode VLIW packets. One reason is that VLIW processors, unlike generic processors, have composite packets which include template bits in addition to the bits corresponding to the individual instructions. Accordingly, there is need in the art for a method and system tailored to encoding composite packets in VLIW processors.

Moreover, it is desirable to be able to simulate execution of the encoded composite VLIW packets before actually executing them on the VLIW processor itself. The VLIW packets are input to a process, called a simulator or simulation, which mimics execution of the VLIW packets on the VLIW processor. The simulation itself may be run on any suitable computer. As part of the simulation process, the encoded composite VLIW packets must be decoded from the bit patterns of the encoded composite VLIW packet back into assembly code for the instructions. In addition to decoding the bit patterns into assembly code for the instructions, the simulation also requires decoding the bit patterns into the assembly code associated with execution of the instructions. As such, there is need in the art to decode composite VLIW packets and also to simulate the VLIW processor's execution of the decoded composite packets.

SUMMARY OF THE INVENTION

The present invention is directed to method for encoding and decoding composite VLIW packets and for performing related simulations. To accomplish the encoding of a composite VLIW packet, a bit pattern for a template in the VLIW packet must be determined and placed in the VLIW packet along with the bit patterns corresponding to each individual instruction in the VLIW packet. The template in the VLIW packet is used for, among other things, designating issue groupings of the instructions in the VLIW packet, possible chaining of the instructions in the VLIW packet, and assignment of instruction slots in the VLIW packet to execution units in the VLIW processor.

According to the invention a "resolved packet syntax" corresponding to the combination of the individual instructions in the VLIW packet is initially determined. The invention then attempts to match the resolved packet syntax against the syntax of a selected node in a tree structure. Each term in the resolved packet syntax is matched against a corresponding term in the syntax of a selected node in a first branch level of the tree structure to find either a "direct match" or an "indirect match." A direct match is found when a term in the resolved packet syntax matches a corresponding term in the syntax of the selected node at the first branch level of the tree structure. An indirect match is found when a term in the resolved packet syntax matches a corresponding term in the syntax of the selected node at the second or third or further branch levels in the tree structure.

Various nodes in the first branch level of the tree structure are selected and tried out to determine whether all the terms of the resolved packet syntax match, either directly or indirectly, all the corresponding terms in the syntax of the selected node. The bit pattern of the template corresponding to the matched node is then identified and placed in the VLIW packet along with the bit patterns corresponding to each individual instruction in the combination of instructions for which the resolved packet syntax was initially determined.

To accomplish the decoding of a composite VLIW packet, assembly code is provided for the bit patterns corresponding to each individual instruction in the VLIW packet. The assembly language code for each individual instruction can be provided using conventional means, known in the art as a "disassembler". The bit pattern for the template in the VLIW packet is then matched against a known template. The known template uniquely corresponds to a known syntax. The known syntax is then matched to a resolved packet syntax. For example, the resolved packet syntax can be determined using the assembly code already provided for the individual instructions and the tree structure used to encode the VLIW packet. The resolved packet syntax is then used to provide assembly code associated with the execution of the combination of instructions in the VLIW packet. For example, assembly code associated with the execution of the combination of instructions in the VLIW packet can be used for designating issue groupings of the instructions in the VLIW packet, possible chaining of the instructions in the VLIW packet, and assignment of instruction slots in the VLIW packet to execution units in the VLIW processor.

To accomplish the simulation of a composite VLIW packet, fetching a composite VLIW packet is simulated. For example, fetching can be simulated by placing the VLIW packet in a queue, the length of which simulates the number of pipeline stages available in the processor being simulated. The VLIW packet is then decoded, as above, to provide assembly code associated with the execution of the combination of instructions in the VLIW packet. Issuing of individual instructions is then simulated, for example, by placing the individual instructions in an instruction window. The individual instructions can be placed in the instruction window, for example, according to the designated issue groupings of the instructions in the VLIW packet, possible chaining of the instructions in the VLIW packet, and assignment of instruction slots in the VLIW packet to execution units in the VLIW processor provided by the assembly code associated with the execution of the combination of instructions in the VLIW packet. Allocation of execution units can then be simulated, for example, by the allocation of execution units to the individual instructions according to the instruction slot assignments in the VLIW packet. Execution of each individual instruction by its allocated execution unit is then simulated.

DETAILED DESCRIPTION OF THE INVENTION

Figure 1:
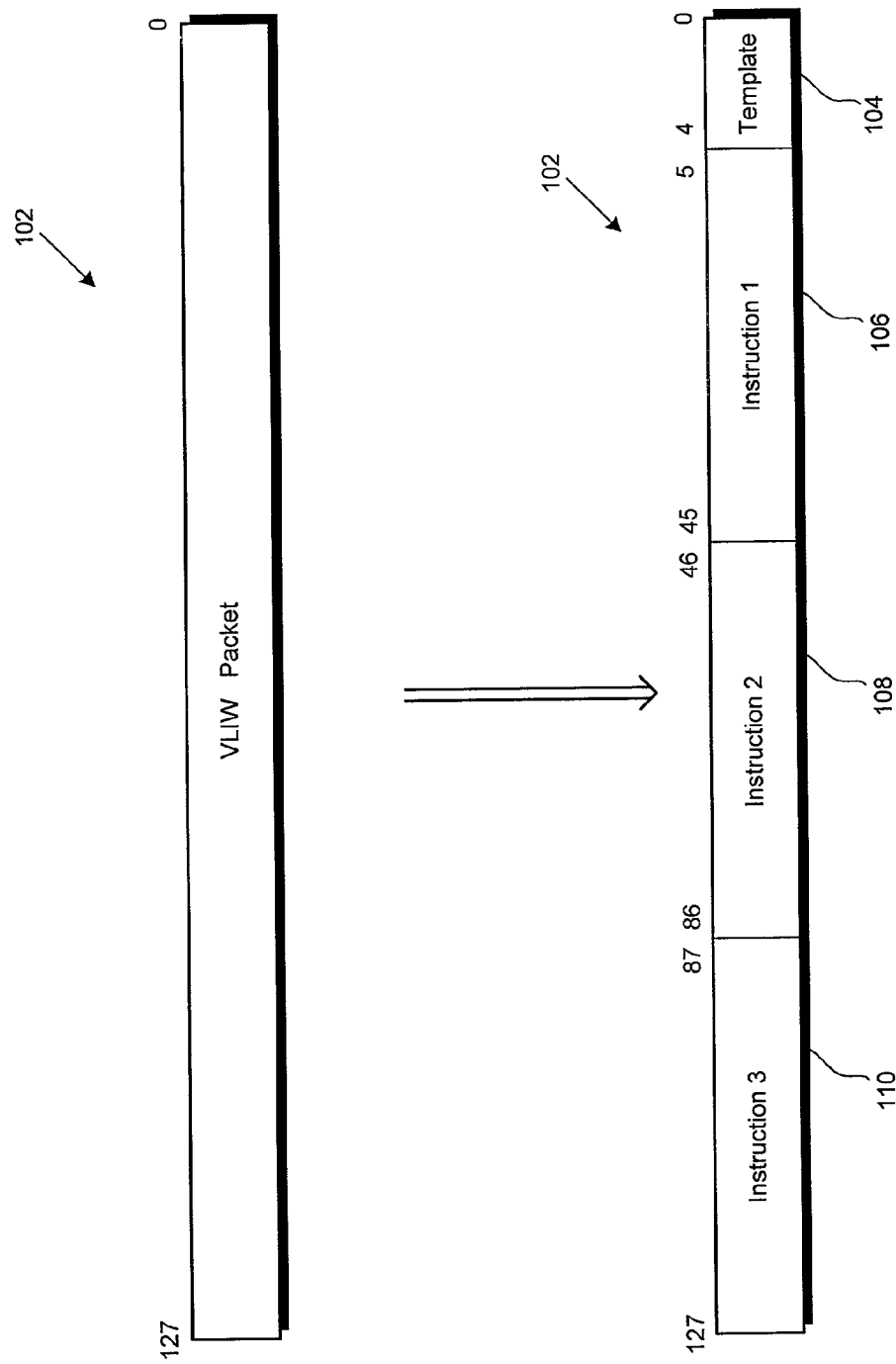
FIG. 1A is a block diagram of an exemplary VLIW packet.
FIG. 1B is a block diagram of an exemplary VLIW packet showing the relative placement of various instruction slots and the template.

The present invention is method and system for decoding and simulating a composite VLIW packet. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

FIG. 1A shows an exemplary 128-bit VLIW packet 102 having bits 0 through 127. The length of a VLIW packet (also referred to as a "composite packet" in the present application) varies from processor to processor and may be 64 bits, 128 bits (which is the length of the VLIW packet in the present example), 256 bits or even greater. However, a common denominator in a VLIW packet is the fact that there are a number of instructions in the VLIW packet, as well as a "VLIW template" (or simply a "template"). For example, a 128-bit VLIW packet may be divided into its constituent instructions and a template in a number of ways. A 128-bit VLIW packet may consist of five 16-bit instructions, one 32-bit instruction, and a 16-bit template. As another example, a 128-bit VLIW packet may consist of three 16-bit instructions, two 32-bit instructions, and a 16-bit template. In the example used in the present application, a 128-bit VLIW packet consists of three 41-bit instructions and a 5-bit template.

FIG. 1B shows an expanded view of VLIW packet 102 consisting of slots 104, 106, 108, and 110. The VLIW packet "template" is located in template slot 104 which occupies bit positions 0 through 4 in VLIW packet 102. "Instruction 1" is located in instruction slot 106 which occupies bit positions 5 through 45. Similarly, "instruction 2" is located in instruction slot 108 which occupies bit positions 46 through 86 while "instruction 3" is located in instruction slot 110 which occupies bit positions 87 through 127.

It is again noted that the number of instructions in the present example (i.e. three), the number of bits in each instruction (i.e. 41), and the number of bits in the template (i.e. 5) in VLIW packet 102 are purely exemplary and can vary from processor to processor. Moreover, although in the present example the template consists of five consecutive bits (i.e. five bits in bit position 0 through bit position 4), in some VLIW processors the template may consist of bits which are spread throughout the packet at non-consecutive bit positions. However, the invention described in this application applies regardless of the above-stated variations in the form of the VLIW packet and the VLIW template.

In a typical VLIW processor each instruction in a VLIW packet, such as instruction 1, instruction 2, or instruction 3, can be categorized as being of a certain "instruction type." Typically, there are a number of instruction types in a VLIW processor. In the example given in the present application, the different instruction types are instruction type A, instruction type I, instruction type M, instruction type F, instruction type B, and instruction type LX. In the present example, instruction type A (also referred to as "type A instruction") refers to "integer ALU" instructions. Examples of integer ALU instructions are "Shift and Add" and "Compare" instructions. In the present example, instruction type I (also referred to as "type I instruction") refers to "non-integer ALU" instructions. Examples of non-integer ALU instructions are "Shift L Variable," "Shift R Variable," "Move to BR," and "Move from BR" instructions.

Continuing with the present example, instruction type M (also referred to as "type M instruction") refers to "memory" instructions. Examples of memory instructions are "Integer Load," "Integer Store," and "Line Prefetch" instructions. Instruction type F (also referred to as "type F instruction") refers to "floating-point" instructions. Examples of floating point instructions are "Floating Point Set Controls," "Floating Point Compare," and "Floating Point Clear Flags" instructions. In the present example, instruction type B (also referred to as "type B instruction") refers to "branch" instructions. Examples of branch instructions are "Counted Branch," "Indirect Branch," and "Indirect Call." Finally, instruction type LX (also referred to as "type LX instruction") refers to "long instructions" an example of which is "Move Imm".

As stated above, each instruction type can be executed in one or two specific execution units. In the present example, instruction type A can be executed in execution unit I or execution unit M. Instruction type I can be executed in execution unit I, instruction type M can be executed in execution unit M, instruction type F can be executed in execution unit F, instruction type B can be executed in execution unit B, and instruction type LX can be executed in execution unit I. Thus, allocating a certain execution unit in a VLIW processor to a certain instruction slot in a VLIW packet would, in effect, specify the instruction type (or types) that can be placed in that instruction slot.

To illustrate the invention's method to encode a VLIW packet, the following example is used. In this example instruction 1 is "add r1=r2, r3, 1". In this "Add" instruction, r2 is the name of a register in the VLIW processor where the first operand is stored and r3 is the name of another register in the VLIW processor where the second operand is stored. According to this instruction, the contents of registers r2 and r3 are added, and a "1" is added to the total. The grand total is then stored in register r1 in the VLIW processor. In the present example, instruction 2 is "(p1) add r4=r5, r6". This "Add" instruction is performed depending on the value stored in a "predicate" register p1. Predicate register p1 is a one-bit register which has either a "1" or a "0" stored therein. According to this instruction, data in registers r5 and r6 are added and the total is stored in register r4 only if the value stored in predicate register p1 is a "1". If the value stored in predicate register p1 is a "0", this "Add" instruction is skipped.

Suppose further that, according to the present example, instruction 3 is "add r7=r1, r4". According to this instruction, the contents of registers r1 and r4 are added and the total is stored in register r7. It is observed that the contents of registers r1 and r4 are determined, respectively, by instruction 1 and instruction 2. Accordingly, there is a "data dependency" between instruction 3 and each of instructions 1 and 2. In other words, the result of instruction 3 depends on the data resulting from the execution of instructions 1 and 2.

Template 104 in VLIW packet 102 in FIG. 1 contains information that is necessary for proper execution of each of instructions 1 through 3 in VLIW packet 102. In the present example, template 104 contains information regarding which "issue group" each of instructions 1 through 3 belongs to. Template 104 contains information regarding whether instructions 1 through 3 belong to the same issue group or whether any of instructions 1 through 3 is "chained" to an issue group in a subsequent VLIW packet. Moreover, template 104 contains information for mapping of instruction slots 106, 108, and 110 to various "execution units" in the VLIW processor.

As stated above, a VLIW packet typically contains a number of instructions whose execution can begin in the same clock cycle. That is also the case in the VLIW packet of the present example. Instructions in a VLIW packet whose execution can begin in the same clock cycle form a single "issue group." By definition, instructions belonging to a same issue group do not depend on the result of execution of other instructions in that same issue group. However, instructions in one issue group may depend on the result of execution of instructions in another issue group. As stated above, the template in a VLIW packet contains information as to which instructions in the VLIW packet belong to the same issue group.

In the present example, instructions 1 and 2 have no data dependencies. The first instruction operates on the data contained in registers r2 and r3 while the second instruction operates on the data contained in registers r5 and r6. As such, instruction 1 does not depend on the execution or result of instruction 2; nor does instruction 2 depend on the execution or result of instruction 1. Since these two instructions are independent, their execution can begin in the same clock cycle and, therefore, can be placed in the same issue group.

However, as stated above, instruction 3 adds the contents of registers r1 and r4; and the contents of both of these registers are determined by the result of execution of, respectively, instructions 1 and 2. Accordingly, instruction 3 depends on the result of execution of both instructions 1 and 2. As such, instruction 3 cannot be executed in the same clock cycle in which instructions 1 and 2 are being executed. Thus, instruction 3 cannot belong to the same issue group to which instructions 1 and 2 belong.

An instruction in a first VLIW packet which does not belong to an issue group in the first VLIW packet may belong to an issue group in a second VLIW packet. This is referred to as "chaining" of that instruction to an issue group in the second VLIW packet. In the present example, instruction 3 is in fact chained to an issue group in a subsequent VLIW packet. In other words, instruction 3 is chained to an issue group in the VLIW packet following VLIW packet 102 in FIG. 1B.

Thus, template 104 in VLIW packet 102 must contain information as to the arrangement of the issue groups in VLIW packet 102 and whether any of the instructions in VLIW packet 102 is chained to an issue group in a subsequent VLIW packet. In the present example, the information contained in template 104 should indicate that instructions 1 and 2 are in the same issue group while instruction 3 is not in that issue group. Template 104 should also indicate that instruction 3 is chained to an issue group in the next VLIW packet.

In addition to having information as to issue grouping and chaining of the instructions in VLIW packet 102, template 104 also contains information for mapping of instruction slots 106, 108, and 110 into the various "execution units" in the VLIW processor. In other words, template 104 identifies the various "execution units" to which each instructions in instruction slots 106, 108, and 110 is assigned for execution. An execution unit is a hardware unit that can be used, and can in fact be shared, by a number of different instructions in a VLIW processor. Since there is more than one execution unit in a VLIW processor, there must be an assignment of the various execution units to the various instructions in a VLIW packet. One way to perform such assignment is by assigning each instruction slot 106, 108, and 110 to a particular execution unit. Thus, the instruction that is placed in a particular instruction slot is assigned a certain execution unit indicated by the template.

In the VLIW processor of the present example, there are four execution units which are execution unit M, execution unit I, execution unit F, and execution unit B. Execution unit M can execute instruction types A and M. Execution unit I can execute instruction types A, I, and LX. Execution unit F can execute an instruction type F while execution unit B can execute an instruction type B.

By way of few specific examples, in the VLIW processor used as an example in the present application, a template "00001" indicates that instruction slot 106 is assigned to execution unit I, instruction slot 108 is assigned to execution unit I, and instruction slot 110 is assigned to execution unit M. From the above explanation it is apparent that, when template 104 contains bits "00001", instruction slot 106 may be used for holding either instruction type A or instruction type I; instruction slot 108 may be used for containing either instruction type A or instruction type I; while instruction slot 110 may be used for holding either instruction type A or instruction type M. Thus, when template 104 is "00001", instructions 1 and 2 in VLIW packet 102 are either type A or type I while instruction 3 is either type A or type M. The template "00001" also indicates that all of the instructions in VLIW packet 102 are in the same issue group.

As another specific example, a template "00010" indicates that instruction slot 106 may be used for either instruction type A or instruction type I; instruction slot 108 may be used for either instruction type A or instruction type I; while instruction slot 110 may be used for either instruction type A or instruction type M. This mapping of instruction slots into execution units is identical to that permitted by template "00001". However, template "00010" indicates that the instructions in instruction slots 106 and 108 are in the same issue group, while the instruction in instruction slot 110 is chained to an issue group in the next VLIW packet. Thus, instructions 1 and 2 which can be either instruction type A or instruction type I and belong to the same issue group, while instruction 3 can be either instruction type A or instruction type M and is chained to an issue group in the next VLIW packet.

As yet another specific example, a template "00011" indicates that instruction slot 106 may be used for either instruction type A or instruction type I; instruction slot 108 may be used for either instruction type A or instruction type I; while instruction slot 110 may be used for either instruction type A or instruction type M. Thus far, this combination is identical those permitted by templates "00001" and "00010". However, template "00011" indicates that the instructions in slots 106 and 108 are in the same issue group, while the instruction in slot 110 is in a separate issue group by itself. Moreover, template "00011" indicates that the instruction in slot 110 is not chained to an issue group in the next VLIW packet. Thus, instructions 1 and 2 can be either instruction type A or instruction type I and belong to the same issue group, while instruction 3 can be either instruction type A or instruction type M and is in an issue group by itself and, moreover, it is not chained to an issue group in the next VLIW packet.

As another example, a template "11101" indicates that instruction slot 106 may be used for either instruction type A or instruction type M; instruction slot 108 may be used only for instruction type F; while instruction slot 110 may be used only for instruction type B. Template "11101" also indicates that the instructions in slots 106, 108, and 110 are in the same issue group and are not chained to an issue group in the next VLIW packet. Thus, when template 104 in VLIW packet 102 is "11101", instruction 1 can be either instruction type A or instruction type M, instruction 2 can be only instruction type F, and instruction 3 can be only instruction type B, and all instructions 1, 2, and 3 belong to the same issue group and are not chained to an issue group in the next VLIW packet.

Thus, it is appreciated that a particular five-bit combination of template 104 defines a unique mapping of instruction slots 106, 108, and 110 in VLIW packet 102 to execution units I, M, F, and B. Furthermore, a particular five-bit combination of template 104 also uniquely defines the issue grouping and possible chaining of instructions 1, 2, and 3 in VLIW packet 102. However, a number of different VLIW instructions may be placed in instruction slots 106, 108, and 110, as long as the VLIW instructions placed in those instruction slots match the corresponding execution units that are mapped to those instruction slots. For example, as discussed above, when template 104 is "00010", instruction 1 can be either instruction type A or instruction type I. As long as that restriction is met, instruction 1 can be a number of different instructions. For example, the different instructions "ALU", "Shift L and Add", "Compare", "Compare to Zero", and "MM Shift and Add" are all type A instructions while the different instructions "Shift L Variable", "Shift Right Pair", "Move to BR", and "Move to Pred" are all type I instructions. Thus, when template 104 is "00010", instruction 1 can be any type A or type I instruction.

Continuing with the particular example provided in this application, one of the goals of the present invention is to compose entire VLIW packets based on a given set of instructions. In other words, starting from a given set of instructions, the invention uses an efficient method to determine a unique template (i.e. a unique five-bit pattern for template 104) for each VLIW packet 102. As such, from a given set of assembly language instructions, entire VLIW packets are "encoded." In the present example, encoding involves determining a five-bit pattern for template 104 and placing that five-bit pattern next to the bit patterns corresponding to instructions to be placed in instruction slots 106, 108, and 110. In this manner, the entire bit pattern for a given VLIW packet is determined and, as such, the VLIW packet is "encoded."

The specific instructions used in the present example along with the "syntax" used in assembly language form are listed below:

add r1=r2, r3, 1;
   (p1) add r4=r5, r6;;
   add r7=r1, r4 ++;

As recalled from the discussion above, instruction 1 is "add r1=r2, r3, 1" while instruction 2 is "(p1) add r4=r5, r6" and instruction 3 is "add r7=r1, r4". According to the exemplary assembly language used in the present application, the "syntax" in the set of instructions 1 through 3 is the semicolon (";") at the end of the instruction 1, the double semicolon (";;") at the end of instruction 2, and the double plus sign and semicolon ("++" and ";") at the end of instruction 3. In the present application, the assembly code for the syntax of a combination of instructions, such as the syntax in the set of instructions 1 through 3, is also referred to as the assembly code associated with execution of the combination of instructions.

In the present assembly language example, a single semicolon at the end of an instruction indicates that that instruction belongs to an issue group together with at least the very next instruction. Thus, the single semicolon at the end of instruction 1 means that instruction 1 belongs to an issue group which includes at least instruction 2. A double semicolon at the end of an instruction indicates that the end of an issue group has been reached. Thus, the double semicolon at the end of instruction 2 indicates that instruction 2 is the last instruction in the issue group. Accordingly, one of the issue groups in VLIW packet 102 consists of only instructions 1 and 2 and no other instructions. A double plus sign and semicolon at the end of an instruction indicates that the instruction is "chained" to an issue group in the next VLIW packet, i.e. the instruction belongs to an issue group in the next VLIW packet. Accordingly, instruction 3 in VLIW packet 102 belongs to an issue group in the next VLIW packet (the next VLIW packet is not shown in any of the Figures).

From the assembly code description of instructions 1, 2, and 3, and the assembly code associated with the execution of instructions 1 through 3, i.e. from the following assembly code:

add r1=r2, r3, 1;
   (p1) add r4=r5, r6;;
   add r7=r1, r4 ++;

the invention determines all of the bits 0 through 127 in VLIW packet 102. The first step in making this determination is to determine the bit pattern corresponding to each individual instruction, i.e. the first step is to encode each individual instruction. This encoding can be done using a conventional description-based assembler.

In the present example, encoding of instruction 1, i.e. "add r1=r2, r3, 1" results in the 41-bit pattern: "10000000000001000001100000100000001000000". The encoding of instruction 2, i.e. "(p1) add r4=r5, r6" results in the 41-bit pattern: "10000000000000000001100000101000001000000001". And the encoding of instruction 3, i.e. "add r7=r1, r4" results in the 41-bit pattern: "10000000000000000001000000000100001111000000".

During this step, conventional methods are also used to determine the instruction types of instructions 1, 2, and 3. Instructions 1, 2, and 3 are all different variations of an "Add" instruction. In the present example all of these "Add" instructions are "Integer ALU" instructions. In other words, all instructions 1, 2, and 3 are type A instructions. Having determined, that instructions 1, 2, and 3 are all type A instructions, the invention creates the following "resolved packet syntax":

A_inst ";" A_inst ";;" A_inst "++" ";"

where A_inst is a synonym with a type A instruction.

Figure 2:
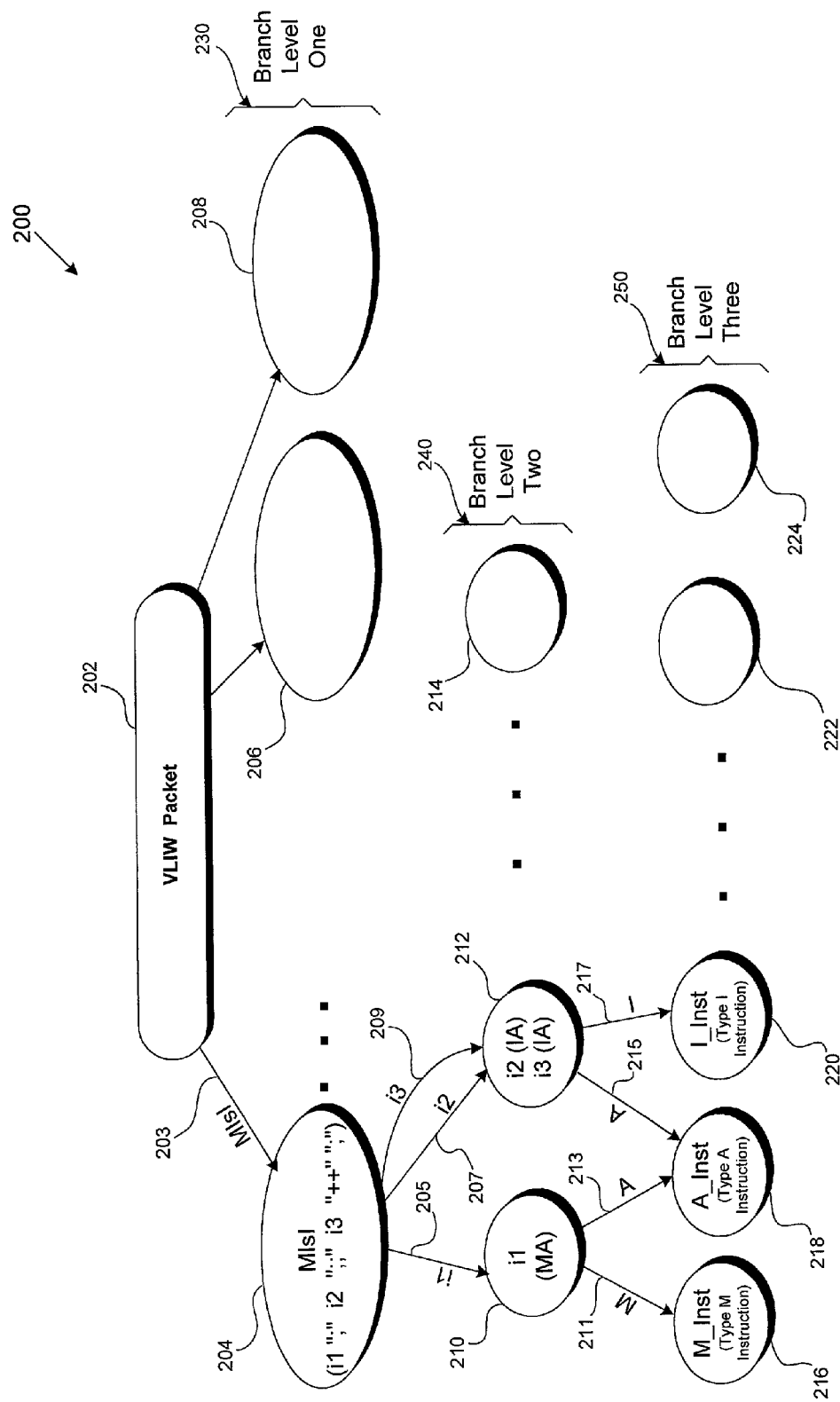
FIG. 2 is a tree structure illustrating the invention's method for encoding a composite VLIW packet.

The invention's resolved packet syntax is then utilized to begin the invention's process of determining the bits in template 104, i.e. the bits in positions 0 through 4 of VLIW packet 102. FIG. 2 is an overview of the invention shown in the form of a tree structure 200 used in determining the bits in template 104. The final VLIW packet to be determined by the invention's tree structure 200 is VLIW packet 202 which includes the template bits in the VLIW packet. As seen in FIG. 2, VLIW packet 202 is the root node of tree structure 200. The invention's tree structure 200 shown in FIG. 2 is written in a programming language called RADL (a programming language created at Conexant Systems, Inc., the assignee of the present application). However, in order not to obscure the present invention, the actual RADL program code for implementation of tree structure 200 is not shown in the present application.

Referring to tree structure 200 in FIG. 2, nodes 204, 206, and 208 are example nodes that are one level below root node 202. Nodes 204, 206, and 208 are examples of nodes that belong to "branch level one" which is generally referred to by numeral 230 in FIG. 2. Nodes in branch level one are also referred to as "first level nodes" in the present application. Each first level node, such as node 204, represents a syntax which uniquely defines issue grouping and chaining of instructions associated with that syntax. The syntax represented by each first level node is also referred to as a "known syntax" in the present application.

Each first level node, such as node 204, also represents a unique mapping of instruction slots 106, 108, and 110 to the various execution units in the VLIW processor. It is recalled that each template in the VLIW processor of the present example uniquely specifies issue grouping and chaining of the instructions in a VLIW packet and that each template also defines a unique mapping of instruction slots 106, 108, and 110 to the various execution units. Thus, each first level node, such as node 204, corresponds to a unique template 104 in VLIW packet 102. Thus, once the resolved packet syntax in the present example (i.e. A_inst ";" A_inst ";;" A_inst "++" ";") is matched to one of the first level nodes, such as node 204, 206, or 208, a unique bit pattern for template 104 is determined.

It is noted that although only the three nodes 204, 206, and 208 are shown as examples of first level nodes in tree structure 200, there are in fact 24 first level nodes. Moreover, although there is a total of 32 different patterns for the five bits comprising template 104, in practice some of the 32 different patterns are reserved. In the present example, eight of these 32 different patterns are reserved and only 24 different patterns for the five bits in template 104 are actually used. From the above discussion it is apparent that the actual use of the 24 different patterns for template 104 means that there are only 24 different combinations of execution unit mappings, issue groupings, and chaining which are permitted in the exemplary VLIW processor of the present application.

According to the invention's method for matching each first level node to a unique five-bit pattern in template 104, each node is identified by a programming notation designating the issue grouping and chaining of the instructions in the corresponding VLIW packet and also designating a particular mapping of execution units into instruction slots. As apparent from the above discussion, 24 of such programming notations are needed, i.e. one unique programming notation is needed for each of the 24 first level nodes. Each of the 24 different programming notations correspond to one of the 24 different combinations of execution unit-instruction slot mappings, issue groupings, and chaining that are permitted in the exemplary VLIW processor of the present application.

Manifestly, programming notations used to refer to the different combinations of execution unit-instruction slot mappings, issue groupings, and chaining of instructions in the exemplary VLIW processor of the present application are a programmer's choice and also depend on the programming language used. For example, when the invention is implemented in the RADL programming language, notations such as "MIIs", "MIsI", "MIsIs", and "MFBs" are used to indicate some of the different combinations of execution unit-instruction slot mappings, issue groupings, and chainings of instructions in the exemplary VLIW processor in the present application.

In this example, the programming notation "MIIs" refers to a VLIW packet having execution unit M assigned to instruction slot 106, execution unit I assigned to instruction slot 108, and execution unit I assigned to instruction slot 110. The lower case letter "s" in the programming notation stands for "stop" indicating that the issue group is complete. Thus, the instructions in this VLIW packet make up a single issue group and are not chained to an issue group in the next VLIW packet.

The next exemplary programming notation "MIsI" refers to a VLIW packet having execution unit M assigned to instruction slot 106 and execution unit I assigned to instruction slot 108. The lower case letter "s" indicates that the first and second instructions located respectively in instruction slots 106 and 108 form a single issue group. According to this exemplary notation (i.e. the notation "MIsI"), execution unit I is also assigned to instruction slot 110. Moreover, since there is no "stop" or "s" after the second "I" in the programming notation "MIsI", the instruction located in instruction slot 110 would be chained to an issue group in the next VLIW packet. In fact, in the present example, node 204 in FIG. 2 is represented by the programming notation "MIsI".

The next exemplary programming notation "MIsIs" refers to a VLIW packet having execution unit M assigned to instruction slot 106 and execution unit I assigned to instruction slot 108. The lower case letter "s" indicates that the first and second instructions located respectively in instruction slots 106 and 108 form a single issue group. According to this exemplary programming notation (i.e. the notation "MIsIs"), execution unit I is assigned to instruction slot 110. Moreover, since there is a "stop" or "s" after the second "I" in programming notation "MIsIs", the instruction located in instruction slot 110 would not be chained to an issue group in the next VLIW packet. In other words, the instruction located in instruction slot 110 is in an issue group by itself.

The next exemplary notation "MFBs" refers to a VLIW packet having execution unit M assigned to instruction slot 106, execution unit F assigned to instruction slot 108, and execution unit B assigned to instruction slot 110. The lower case letter "s" stands for "stop" indicating that the first, second, and third instructions located respectively in instruction slots 106, 108, and 110 are in the same issue group. Thus, the instructions in this VLIW packet make up a single issue group and are not chained to an issue group in the next VLIW packet.

The invention then proceeds to match every term of the "resolved packet syntax" (i.e. A_inst ";" A_inst ";;" A_inst "++" ";") against the syntax associated with each of the 24 first level nodes, i.e. nodes 204, 206, and 208. It is noted that a unique syntax is associated with each first level node and that syntax is defined by the programming notations examples of which were given above. As an example and as stated above, node 204 is represented by the programming notation "MIsI" and the syntax associated with the programming notation "MIsI" is:

i1 ";" i2 ";;" i3 "++" ";"

When the resolved packet syntax (i.e. A_inst ";" A_inst ";;" A_inst "++" ";") is compared to the syntax of node 204 (i.e. i1 ";" i2 ";;" i3 "++" ";"), the invention attempts to determine whether every term of the resolved packet syntax matches a corresponding term in the syntax of node 204. In attempting to determine whether every term of the resolved packet syntax matches a corresponding term in the node syntax, the invention approach looks for a "direct match" or an "indirect match" for the respective terms in the resolved packet syntax and the node syntax. A direct match is when there is an identical match between a term in the resolved packet syntax and a corresponding term in the node syntax at branch level one (i.e. an identical match with a first level node). An indirect match is when there is no identical match with a first level node, but there is an identical match between the term in the resolved packet syntax and the corresponding term in the node syntax at branch levels two, three, or a lower branch level.

In the present example, the first term in the syntax of node 204 is "i1" while the first term in the resolved packet syntax is "A_inst". In this example it is apparent that the first term in the node syntax (i.e. "i1") is not identical to the first term in the resolved packet syntax (i.e. "A_inst") and as such there is no direct match between these two corresponding terms at branch level one. The invention then attempts to determine whether there is an indirect match between the first term in the node syntax (i.e. "i1") and the first term in the resolved packet syntax (i.e. "A_inst"). To perform this determination, the invention attempts to determine the various instruction types that can be assigned to the term "i1" at branch level two.

Branch level two in FIG. 2 is generally referred to by numeral 240. As seen in FIG. 2, this branch level includes nodes such as nodes 210, 212, and 214. Each branch level two node, such as node 210, is also referred to as a second level node in the present application. There are a large number of other nodes in branch level two which are not shown in FIG. 2. Each node at branch level two corresponds to a combination of various instructions. Examples of such instruction combinations are "MA", "IA", "ILX", and "ALX".

In the present example of tree structure 200 in FIG. 2, node 204 in branch level one has path 205 (also marked "i1" in FIG. 2) leading to node 210 in branch level two. Moreover, node 204 in branch level one has paths 207 (also marked "i2" in FIG. 2) and 209 (also marked "i3" in FIG. 2) leading to node 212 in branch level two. Node 210 in branch level two corresponds to instruction combination "MA" while node 212 in branch level two corresponds to instruction combination "IA". As discussed further in a later section of the present application, a node in branch level two corresponding to the instruction combination "MA" leads either to a type M instruction or to a type A instruction.

Likewise, a node in branch level two corresponding to the instruction combination "IA" leads either to a type I instruction or to a type A instruction.

It is noted that paths 205, 207, and 209 in tree structure 200 are set at the initial programming stage when defining the node syntax (i.e. i1 ";" i2 ";;" i3 "++" ";") for the programming notation "MIsI". In the present example, "i1" is defined as being an "MA" instruction combination while "i2" and "i3" are both defined as being "IA" instruction combinations. Thus, tree structure 200 is set such that path 205 (also marked as path "i1") leads to node 210 (representing an "MA" instruction type) while path 207 (also marked as path "i2") and path 209 (also marked as path "i3") both lead to node 212 (representing an "IA" instruction type).

As stated above, since there has been no direct match between the first term in the node syntax (i.e. "i1") and the first term in the resolved packet syntax (i.e. "A_inst"), the invention attempts to determine whether there is an indirect match between the terms "i1" and "A_inst". As also stated above, to accomplish this determination, the invention attempts to determine the various instruction types that are assigned to "i1" at branch level two. As explained above, tree structure 200 has been pre-programmed such that the term "i1" in the node syntax corresponds to instruction combination MA. However there is still no match between the node syntax term "i1" as defined by node 210 at branch level two and the resolved packet syntax term "A_inst". The reason is that the instruction combination "MA" is not identical with the resolved packet syntax term "A_inst". Thus, the invention continues its attempt to determine whether there is a match between "i1" and "A_inst" at a level below, i.e. at branch level three.

As shown in FIG. 2, branch level three is generally referred to by numeral 250 in tree structure 200. Branch level three consists of nodes such as nodes 216, 218, 220, 222, and 224. Each branch level three node, such as node 216, is also referred to as a third level node in the present application. Each node in branch level three corresponds to a certain instruction type. For example, node 216 corresponds to type M instruction, node 218 corresponds to type A instruction, and node 220 corresponds to type I instruction. As shown in FIG. 2, in the present example of tree structure 200 in FIG. 2, node 210 in branch level two has path 211 (also marked "M" in FIG. 2) leading to node 216 in branch level three. Moreover, node 210 in branch level two has path 213 (also marked "A" in FIG. 2) leading to node 218 in branch level three. Node 216 in branch level three corresponds to a type M instruction while node 218 in branch level three corresponds to a type A instruction.

Paths 211 and 213 in tree structure 200 are set at the programming stage when defining the instruction combination "MA". In the present example, "MA" is defined as being either a type A instruction or a type M instruction. Thus, tree structure 200 is set such that path 211 (also marked as path "M") leads to node 216 (representing a type M instruction) while path 213 (also marked as path "A") leads to node 218 (representing a type A instruction).

As stated above, since there has been no direct match between the first term in the node syntax (i.e. "i1") and the first term in the resolved packet syntax (i.e. "A_inst"), the invention attempts to determine whether there is an indirect match between "i1" and the "A_inst". As also stated above, to accomplish this determination, the invention now attempts to determine the various instruction types that are assigned to "i1" at branch level three. Tree structure 200 has been pre-programmed such that instruction combination MA corresponds to either a type M instruction or a type A instruction.

At branch level three, the invention has finally found a match between the node syntax term "i1" and the resolved packet syntax "A_inst". The reason is that node 218 at branch level three which corresponds to a type A instruction is identical with the resolved packet syntax "A_inst". Thus, the invention has verified that the first term in the syntax of node 204 (i.e. i1 ";" i2 ";;" i3 "++" ";") matches the first term in the resolved packet syntax (i.e. A_inst ";" A_inst ";;" A_inst "++" ";"). This match has been an indirect match since there was no match between the respective first terms of the node syntax and the resolved packet syntax at branch level one. Having matched the respective first terms in the node syntax and the resolved packet syntax, the invention will proceed to determine whether the remaining terms in the node syntax and the resolved packet syntax also match.

The next term in the resolved packet syntax (i.e. A_inst ";" A_inst ";;" A_inst "++" ";") is ";" while the next term in the syntax of node 204 (i.e. i1 ";" i2 ";;" i3 "++" ";") is also ";". According there is a direct match of the respective second terms in the resolved packet syntax and the node syntax. The third term in the resolved packet syntax is "A_inst" while the third term in the node syntax is "i2". In the manner described above, the invention determines that "i2" corresponds to instruction combination "IA" represented by node 212 in branch level two. Thereafter, the invention determines that instruction combination "IA" corresponds to type A instruction (node 218 in branch level three) and type I instruction (node 220 in branch level three). At this stage, the invention determines that there is a match between the term "i2" in the node syntax and the term "A_inst" in the resolved packet syntax. Thus, an indirect match between the respective third terms in the syntax of node 204 (i.e. i1 ";" i2 ";;" i3 "++" ";") and the resolved packet syntax (i.e. A_inst ";" A_inst ";;" A_inst "++" ";") has been made.

In the manner described above, the invention determines that there is a direct match between the fourth term (i.e. ";;") in the syntax of node 204 (i.e. i1 ";" i2 ";;" i3 "++" ";") and the fourth term (i.e. ";;") in the resolved packet syntax (i.e. A_inst ";" A_inst ";;" A_inst "++" ";"). Moreover, in the manner described above, the invention also determines that there is an indirect match between the fifth term in the node syntax (i.e. "i3") and the fifth term in the resolved packet syntax (i.e. "A_inst"). The invention also determines that there is a direct match between the sixth term (i.e. "++") in the syntax of node 204 (i.e. i1 ";" i2 ";;" i3 "++" ";") and the sixth term (i.e. "++") in the resolved packet syntax (i.e. A_inst ";" A_inst ";;" A_inst "++" ";"). Finally, the invention determines that there is also a direct match between the seventh term (i.e. ";") in the syntax of node 204 (i.e. i1 ";" i2 ";;" i3 "++" ";") and the seventh term (i.e. ";") in the resolved packet syntax (i.e. A_inst ";" A_inst ";;" A_inst "++" ";").

At this point, all of the terms in the syntax of node 204 and the resolved packet syntax have been matched. It is noted that based on the pre-programmed definition of tree structure 200, there can only be a single node at branch level one that can match a given resolved packet syntax without causing a program description error. Thus, the invention's search for a node at branch level one which has a syntax that corresponds to a given resolved packet syntax ends as soon as a single node at branch level one is matched. In the present example, the search for a matching node ends when the invention determines that the syntax of node 204 matches the target resolved packet syntax.

According to the present invention, each node in branch level one is assigned a unique programming notation and a syntax associated with that programming notation. Moreover, each programming notation assigned to a respective node in branch level one corresponds to a unique template for the VLIW packet. In other words, each node in branch level one identifies a single unique template for the VLIW packet. In the present example, the programming notation "MIsI" has been assigned to node 204 which has the syntax i1 ";" i2 ";;" i3 "++" ";". The programming notation "MIsI" also corresponds to a single five-bit template in VLIW packet 102. In the present example, programming notation "MIsI" corresponds to the template "00010". The VLIW packet can now be fully encoded since the value of all bits and their respective bit positions in the VLIW packet is now known.

As stated above, the template is placed in bit positions 0 through 4 in VLIW packet 102. Also as stated above, the first type A instruction in the series of instructions being encoded (i.e. the instruction "add r1=r2, r3, 1") corresponds to "i1" in the syntax of node 204. According to the pre-programmed definition of tree structure 200 in the present embodiment of the invention, an instruction corresponding to "i1" is to be placed in instruction slot 106 in VLIW packet 102. Accordingly, the first type A instruction being encoded (i.e. "add r1=r2, r3, 1") will be placed in instruction slot 106. Thus, the 41-bit pattern "10000000000001000001100000100000001000000" which corresponds to the instruction "add r1=r2, r3, 1" is placed in bit positions 5 through 45.

Moreover, the second type A instruction in the series of instructions being encoded (i.e. the instruction "(p1) add r4=r5, r6") corresponds to "i2" in the syntax of node 204. According to the pre-programmed definition of tree structure 200 in the present embodiment of the invention, an instruction corresponding to "i2" is to be placed in instruction slot 108 in VLIW packet 102. Accordingly, the second type A instruction being encoded (i.e. "(p1) add r4=r5, r6") will be placed in instruction slot 108. Thus, the 41-bit pattern "10000000000000000011000001010000100000001" which corresponds to the instruction "(p1) add r4=r5, r6" is placed in bit positions 46 through 86.

The third type A instruction in the series of instructions being encoded (i.e. the instruction "add r7=r1, r4") corresponds to "i3" in the syntax of node 204. According to the pre-programmed definition of tree structure 200 in the present embodiment of the invention, an instruction corresponding to "i3" is to be placed in instruction slot 110 in VLIW packet 102. Accordingly, the third type A instruction being encoded (i.e. "add r7=r1, r4") will be placed in instruction slot 110. Thus, the 41-bit pattern "10000000000000000010000000010000111000000" which corresponds to the instruction "add r7=r1, r4" is placed in bit positions 87 through 127.

Thus, the invention has resulted in a complete encoding of the 128-bit VLIW packet 102 by determining the appropriate bits in all bit positions in the VLIW packet. As stated above, in the exemplary VLIW processor used in the present application, the bits in template 104 identify the particular assignment the instructions in the VLIW packet to execution units, the issue groupings of the instructions, and the chaining of the instructions. In other VLIW processors, the template may be used for additional or different characterization of the information contained in the VLIW packet.

From the above discussion, it is manifest that the order of placement of the instructions in the VLIW packet, i.e. which instruction is to be placed in instruction slot 106, which instruction is to be placed in instruction slot 108, and which instruction is to be placed in instruction slot 110, is also determined by the invention by the particular node in branch level one whose syntax has matched the resolved packet syntax. The bit pattern corresponding to each instruction is then placed in the appropriate instruction slot in the VLIW packet. The template bits along with the bits corresponding to each instruction in the VLIW packet complete the entire VLIW packet and as such a VLIW packet is properly and efficiently encoded.

Figure 3A:
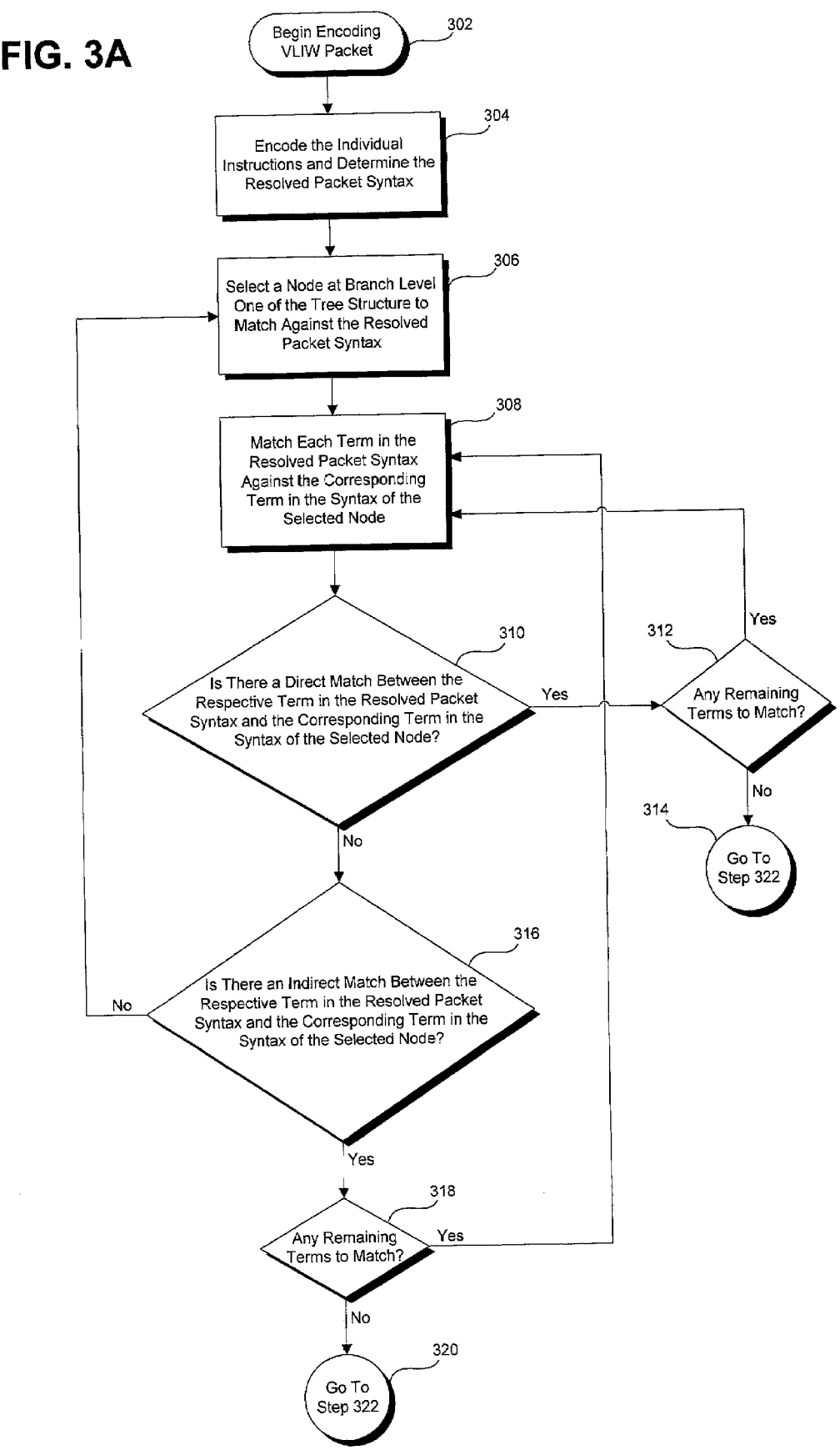
FIGS. 3A and 3B illustrate the invention's method for encoding a composite VLIW packet in flow chart form.
Figure 3B:
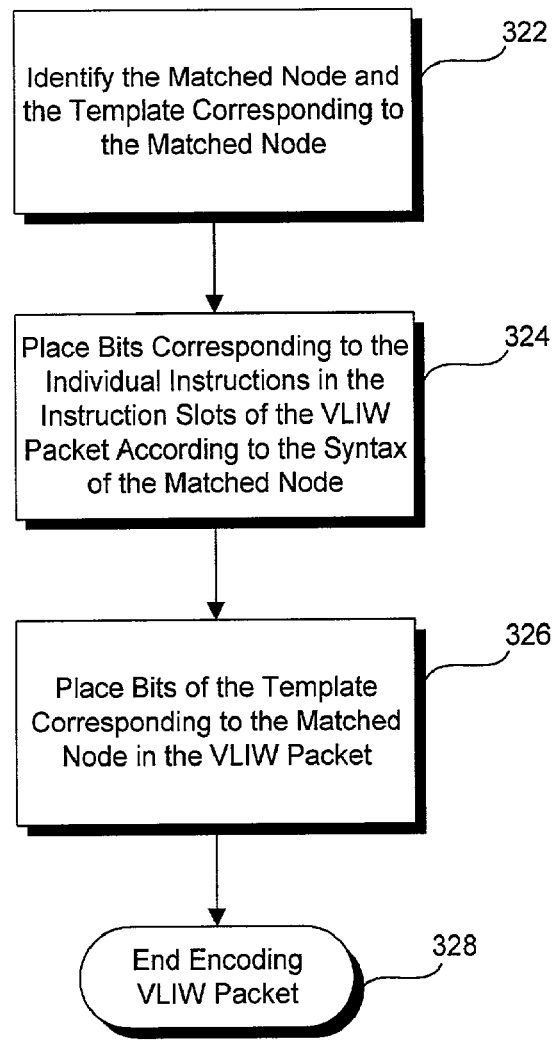

To summarize the invention's approach in encoding a VLIW packet, reference is made to the flow chart in FIGS. 3A and 3B. Referring to FIG. 3A, at step 302 the invention's process for encoding the VLIW packet begins. At step 304, the individual instructions are encoded. In other words, conventional methods are utilized to determine the bit patterns corresponding to each individual instruction. In the example used in this application, the bit patterns corresponding to each of the instructions "add r1=r2, r3, 1" and "(p1) add r4=r5, r6" and "add r7=r1, r4" are determined according to conventional methods. Also at step 304, the "resolved packet syntax" is determined. As explained above, the resolved packet syntax in the present example is: A_inst ";" A_inst ";;" A_inst "++" ";".

At step 306, one of the nodes at branch level one in tree structure 200 (FIG. 2) is selected in order to match the syntax corresponding to that node (i.e. the selected node) against the resolved packet syntax. Examples of nodes at branch level one shown in tree structure 200 (FIG. 2) are nodes 204, 206, and 208. In the example discussed in the present application there are 24 nodes such as nodes 204, 206, and 208 in branch level one. According to the invention, a unique programming notation refers to each of these 24 nodes. Examples of such programming notations given above are "MIIs", "MIsI", "MIsIs", and "MFBs". At step 306 one of the 24 nodes in branch level one is selected for a "try out" to determine whether that particular node has a syntax that matches the resolved packet syntax.

At step 308, each term in the resolved packet syntax is matched against the corresponding term in the syntax of the selected node. In the present example where the selected node is node 204 (with the programming notation "MIsI"), the syntax corresponding to that node is: i1 ";" i2 ";;" i3 "++" ";". At step 310, the invention determines whether there is a "direct match" between the respective term in the resolved packet syntax and the corresponding term in the node syntax. In the present example, the first term in the resolved packet syntax is "A_inst" while the first term in the node syntax is "i1". As explained above, there is no direct match between these two terms since the terms are not identical. Had there been a direct match between the two terms, the invention's process would have continued to step 312. At step 312 it is determined whether there are any remaining terms in the resolved packet syntax that must be matched against the corresponding terms in the syntax of the selected node. If there are any remaining terms, the invention continues by going back to step 308. If there are no remaining terms, the invention proceeds to step 322 (shown in FIG. 3B) through connector 314.

When there is no direct match between the two terms being compared, the invention proceeds to step 316. At step 316, the invention determines whether there is an indirect match between the respective term in the resolved packet syntax and the corresponding term in the node syntax. In the present example, the invention must determine whether there is an indirect match between the first term in the resolved packet syntax (i.e. "A_inst") and the first term in the syntax of node 204 (i.e. "i1"). The process of determining whether there is an indirect match between the two terms involves finding a path leading from node 204 (which is also referred to by the programming notation "MIsI") to a node representing a type A instruction. As discussed above, this process involves going through path 205 (also marked as "i1") to reach node 210 in branch level two having the programming notation "MA". The process continues by going through path 213 (also marked "A") to reach node 218 in branch level three corresponding to a type A instruction (which is synonymous with "A_inst"). In this manner, an indirect match between the first term in the syntax of node 204 (i.e. "i1") and the first term in the resolved packet syntax (i.e. "A_inst") is found.

At step 318 it is determined whether there are any remaining terms in the resolved packet syntax that must be matched against the syntax of the selected node. If there are any remaining terms, the invention continues by going back to step 308. If there are no remaining terms, the invention proceeds to step 322 (FIG. 3B) through connector 320.

It is noted that if at step 316 it is determined that there is not even an indirect match between the two terms being compared, the invention proceeds back to step 306 and a new node at branch level one is selected to determine whether the syntax of the newly selected node would match the resolved packet syntax. Each node at branch level one, such as nodes 204, 206, and 208, is selected and tried out in this manner to eventually arrive at a node whose syntax matches the resolved packet syntax. When the syntax of a selected node completely matches the resolved packet syntax, the invention proceeds to step 322 (FIG. 3B).

At step 322, the node whose syntax has completely matched the resolved packet syntax (also called the "matched node" in the present application) and the template corresponding to the matched node are identified. In the present example, the matched node is node 204 which is represented by the programming notation "MIsI". As explained above, each node in branch level one has a unique template associated with it. In the present example the template assigned to node 204 (i.e. the template assigned to the programming notation "MIsI") is "00010".

At step 324, the bit pattern corresponding to the individual instructions, i.e. the bit patterns corresponding to the instructions "add r1=r2, r3, 1" and "(p1) add r4=r5, r6" and "add r7=r1, r4" are assigned to the instruction slots of the VLIW packet according to the syntax of the matched node. In the present example, instruction "add r7=r1, r4" corresponds to instruction "i3" in the syntax of the matched node (i.e. the syntax of node 204). According to the pre-programmed definition of tree structure 200 in the present embodiment of the invention, instruction slot 110 contains the bits corresponding to instruction "i3". Thus, the bit pattern corresponding to instruction "add r7=r1, r4" are placed in bit positions 87 through 127 in VLIW packet 102. In the present example, instruction "(p1) add r4=r5, r6" corresponds to instruction "i2" in the syntax of the matched node (i.e. the syntax of node 204). According to the pre-programmed definition of tree structure 200 in the present embodiment of the invention, instruction slot 108 contains the bits corresponding to instruction "i2". Thus, the bit pattern corresponding to instruction "(p1) add r4=r5, r6" are placed in bit positions 46 through 86 in VLIW packet 102. Finally, in the present example, instruction "add r1=r2, r3, 1" corresponds to instruction "i1" in the syntax of the matched node (i.e. in the syntax of node 204). According to the pre-programmed definition of tree structure 200 in the present embodiment of the invention, instruction slot 106 holds the bits corresponding to instruction "i1". Thus, the bit pattern corresponding to instruction "add r1=r2, r3, 1" are placed in bit positions 5 through 45 in VLIW packet 102.

At step 326, the invention places the bits corresponding to the template in bit positions 0 through 4 of VLIW packet 102. Thus, in the present example, the template bits "00010" are placed in bit positions 0 through 4 of the VLIW packet. Step 326 completes the encoding of the entire VLIW packet since all the bits positions 0 through 127 in VLIW packet 102 are now filled in. Accordingly, the invention's process for encoding the VLIW packet is complete and ends in step 328.

The present invention also includes decoding a composite VLIW packet from a given bit pattern for the composite VLIW packet. In the present example, composite VLIW packet 102 shown in FIG. 1A contains 128 bits. The decoding operation involves identifying the individual instructions in the composite VLIW packet in assembly language form. Moreover, the decoding operation involves determining the issue grouping of the identified instructions. In other words, the decoding operation results in a determination of how many issue groups are in the VLIW packet and which instructions are in each issue group. Further, the decoding of the VLIW packet results in a determination of whether any of the instructions in a first VLIW packet should be chained to an issue group in a second VLIW packet.

In essence, the decoding operation is the reverse of the encoding operation. The encoding operation results in the conversion of assembly code for a combination of instructions, and assembly code corresponding to issue grouping and chaining information into 128 bits to be placed in a particular order in a VLIW packet. In other words, the encoding operation results in determination and placement of 128 bits in appropriate instruction slots and in the template of the VLIW packet. On the other hand, the decoding operation converts 128 bits which are already placed in the instruction slots and the template of a VLIW packet into assembly code for a corresponding combination of instructions, and assembly code corresponding to issue grouping and chaining information. The result of the decoding operation can be used to simulate the decoded instructions in a manner discussed in a later section of this application.

Figure 4:
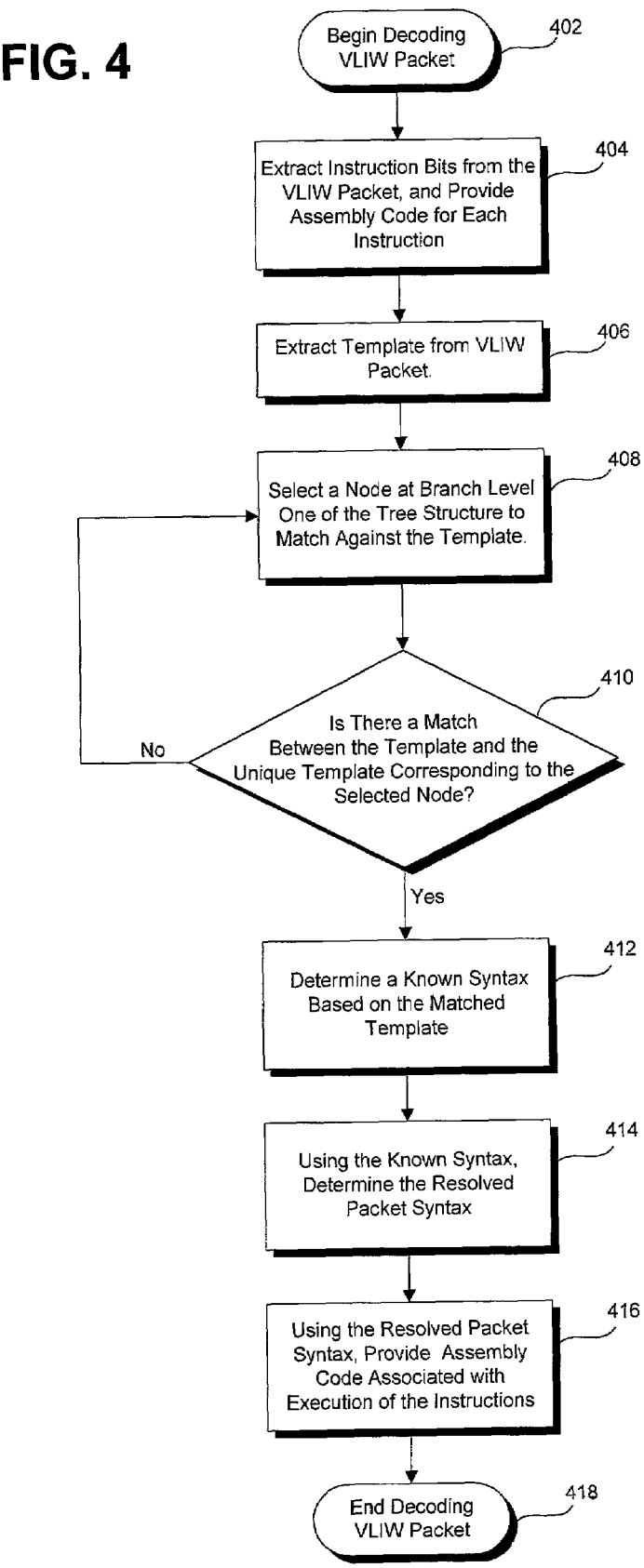
FIG. 4 illustrates the invention's method for decoding a composite VLIW packet in flow chart form.

In one embodiment, the present invention includes a unique approach to decoding a VLIW packet. With respect to the invention's approach in decoding a VLIW packet, reference is made to the flow chart in FIG. 4. Referring to FIG. 4, at step 402 the invention's process for decoding the VLIW packet begins. At step 404, the individual instructions are decoded. In other words, conventional methods are utilized to determine the individual instructions corresponding to each bit pattern in each instruction slot of the VLIW packet.

Continuing with step 404, recall that upon completion of the encoding of VLIW packet 102, all the bit positions of the entire VLIW packet, 0 through 127, in VLIW packet 102 are filled in. The bit patterns corresponding to the individual instructions, i.e. the bit patterns corresponding to the instructions "add r1=r2, r3, 1" and "(p1) add r4=r5, r6" and "add r7=r1, r4", are assigned to the instruction slots of VLIW packet 102 according to the syntax of the matched node (i.e. the syntax of node 204). Recall that in the example used in this application, instruction "add r7=r1, r4" corresponds to instruction "i3" in the syntax of the matched node (i.e. the syntax of node 204).

According to the pre-programmed definition of tree structure 200 in the present embodiment of the invention, instruction slot 110 contains the bits corresponding to instruction "i3". Thus, in the present example, bit positions 87 through 127 in VLIW packet 102 contain the bit pattern corresponding to instruction "add r7=r1, r4". Also, in the present example, instruction "(p1) add r4=r5, r6" corresponds to instruction "i2" in the syntax of the matched node (i.e. the syntax of node 204). According to the pre-programmed definition of tree structure 200 in the present embodiment of the invention, instruction slot 108 contains the bits corresponding to instruction "i2". Thus, in the present example, bit positions 46 through 86 in VLIW packet 102 contain the bit pattern corresponding to instruction "(p1) add r4=r5, r6".

Finally, in the present example, instruction "add r1=r2, r3, 1" corresponds to instruction "i1" in the syntax of the matched node (i.e. in the syntax of node 204). According to the pre-programmed definition of tree structure 200 in the present embodiment of the invention, instruction slot 106 holds the bits corresponding to instruction "i1". Thus, in the present example, bit positions 5 through 45 in VLIW packet 102 contain the bit pattern corresponding to instruction "add r1=r2, r3, 1". Therefore, it is known which bit positions of VLIW packet 102 correspond to the bit patterns of individual instructions. Thus, the bit patterns corresponding to each of the individual instructions, in the present example, "add r1=r2, r3, 1" and "(p1) add r4=r5, r6" and "add r7=r1, r4", are decoded according to conventional methods.

At step 406, as at step 404, it is known which bit positions of VLIW packet 102 correspond to the bit patterns of the template. Bit positions 0 through 4 of VLIW packet 102 contain the bits corresponding to the template. Thus, in the present example, bit positions 0 through 4 of VLIW packet 102 contain the template bits "00010" of template 104. Thus, at step 406, the template is extracted from the VLIW packet.

At step 408, one of the nodes at branch level one in tree structure 200 (FIG. 2) is selected in order to match the template extracted from the VLIW packet. Examples of nodes at branch level one shown in tree structure 200 (FIG. 2) are nodes 204, 206, and 208. In the example discussed in the present application there are 24 nodes such as nodes 204, 206, and 208 in branch level one. According to the invention, a unique template is associated with each of these 24 nodes. In the present example the template assigned to node 204 is "00010". At step 408 one of the 24 nodes in branch level one is selected for a "try out" to determine whether that particular node has an associated template, referred to as the "known template", that matches the template extracted from the VLIW packet.

At step 410, if it is determined that there is not a match between the known template of the selected node and the template extracted from the VLIW packet, the invention proceeds back to step 408, and a new node at branch level one is selected to determine whether the known template of the newly selected node would match the template extracted from the VLIW packet. Each node at branch level one, such as nodes 204, 206, and 208, is selected and tried out in this manner to eventually arrive at a node whose known template matches the template extracted from the VLIW packet. When the known template of a selected node matches the template extracted from the VLIW packet, the invention proceeds to step 412. In the present example, the unique template associated with node 204, i.e. the known template, is "00010", which matches the template extracted from VLIW packet 102. Thus, in the present example, decoding proceeds to step 412 with the matched template corresponding to node 204.

At step 412, a known syntax based on the matched template is determined. In the present example, the matched template corresponds to node 204, which is a branch level one node. According to the invention, a unique programming notation refers to each of the 24 branch level one nodes. Examples of such programming notations given above are "MIIs", "MIsI", "MIsIs", and "MFBs" In the present example, node 204 is represented by the programming notation "MIsI" (i.e. the matched template is the template assigned to the programming notation "MIsI"). As explained above, a unique syntax is associated with each first level node and that syntax is defined by the programming notations, of which the programming notation "MIsI" is an example.

In the present example and as stated above, node 204 is represented by the programming notation "MIsI", and the syntax associated with the programming notation "MIsI" is: i1 ";" i2 ";;" i3 "++" ";". Thus, the matched template corresponds to a branch level one node, which is represented by a unique programming notation, which defines a unique syntax associated with the branch level one node, which is the known syntax. In this way, the matched template determines a known syntax. In the present example, the matched template "00010" corresponds to node 204; node 204 is represented by the programming notation "MIsI"; and "MIsI" uniquely defines the known syntax: i1 ";" i2 ";;" i3 "++" ";".

At step 414, the "resolved packet syntax" is determined using the known syntax. Assembly code has been provided at step 404 for each individual instruction. In the present example, assembly code has been provided for each of the instructions corresponding to "i1", "i2", and "i3". As stated above, conventional methods are used to determine the instruction type of the instructions corresponding to "i1", "i2", and "i3". Thus, the instruction type of each instruction can be substituted into the known packet syntax to replace each term corresponding to an instruction with a term denoting the instruction type, i.e. a synonym with the type of instruction.

In the present example, where each instruction is an add type instruction, "i1" in the known packet syntax is replaced with "A_inst" (which is a synonym for an add or type A instruction) in the resolved packet syntax. Likewise, "i2" is replaced with "A_inst", and "i3" is replaced with "A_inst". Thus, in the present example, the resolved packet syntax is determined to be: A_inst ";" A_inst ";;" A_inst "++" ";" using the known packet syntax: i1 ";" i2 ";;" i3 "++" ";". It is noted that the resolved packet syntax "matches" the known packet syntax using the encoding of the invention, that is, using direct and indirect matching. Thus, determining the resolved packet syntax from the known packet syntax is effectively the "reverse" process of "matching" the resolved packet syntax to the syntax corresponding to a node used in encoding the packet.

At step 416, assembly code associated with execution of the combination of instructions in the VLIW packet is provided. Assembly code has been provided at step 404 for each individual instruction, and the resolved packet syntax has been provided at step 414. The assembly code for individual instructions and the resolved packet syntax are combined to provide assembly code associated with execution of the combination of instructions. Assembly code for each instruction is substituted into the resolved packet syntax to replace the instruction's type, e.g. "A_inst", in the resolved packet syntax with the assembly code for the instruction.

In the present example, where the resolved packet syntax is A_inst ";" A_inst ";" A_inst "++" ";", the first occurrence of "A_inst" (which is a synonym for a type A or add instruction) is replaced by the assembly code for the add instruction, provided at step 404, "add r1=r2, r3, 1". Likewise, the second occurrence of "A_inst" in the resolved packet syntax is replaced by "(p1) add r4=r5, r6", and the third occurrence of "A_inst" is replaced by "add r7=r1, r4". Thus, the complete assembly code: "add r1=r2, r3, 1; (p1) add r4=r5, r6;; add r7=r1, r4 ++;" is provided. The complete assembly code provides both the assembly code for each individual instruction and the assembly code associated with execution of the combination of instructions.

Step 416 completes the decoding of the entire VLIW packet since the complete assembly code, which in the present example is: "add r1=r2, r3, 1; (p1) add r4=r5, r6;; add r7=r1, r4 ++;", is now provided. Accordingly, the invention's process for decoding the VLIW packet is complete and ends in step 418.

Figure 5:
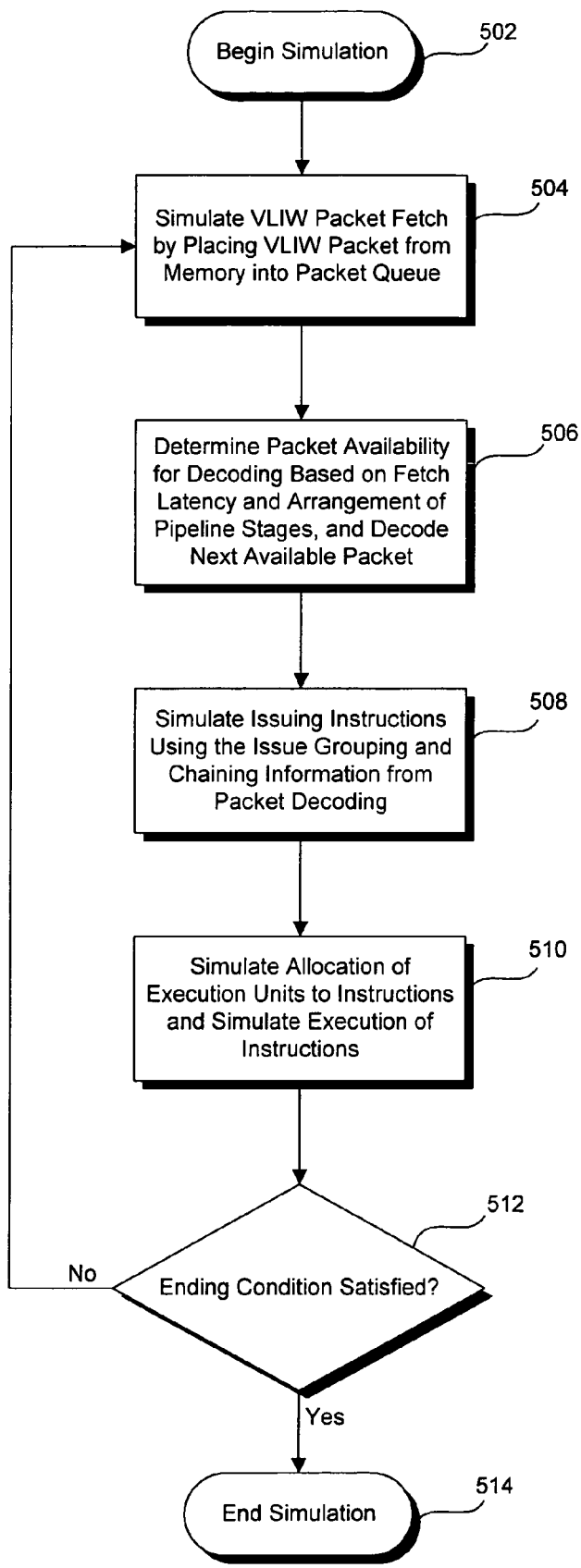
FIG. 5 illustrates the invention's method for simulating execution of a composite VLIW packet in flow chart form.

In one embodiment, the invention also includes a unique approach for simulating a decoded VLIW packet. With respect to the invention's approach in simulating a VLIW packet, reference is made to the flow chart in FIG. 5. Referring to FIG. 5, at step 502 the invention's process for simulating execution of a VLIW packet begins. At step 504, fetching a VLIW packet is simulated by simulating the steps of retrieving a VLIW packet from memory and placing the VLIW packet into a packet queue. The length of the packet queue reflects the ability of the processor being simulated to handle more than one VLIW packet at a time. For example, in a "pipeline" processor architecture, the processing of packets is performed in stages, where the stages are arranged so that some stages are performed subsequent to others.

In a pipeline processor, the processor may be able to handle the later stages of processing one packet while it is handling the earlier stages of processing a second packet. To simulate that case, the length of the packet queue, also referred to as "queue length," would be set to 2. To simulate a processor which is capable of handling the various stages of processing 3 packets at a time, the queue length would be set to 3, and so forth. For the example used in this application, the queue length is set to 2.

Continuing with step 504, the step of fetching a VLIW packet from memory is simulated by the fetch latency. The fetch latency reflects the time delay in a processor between making a request to retrieve a packet from memory and the packet's becoming available for processing. The fetch latency is the amount of time, measured in machine cycles or simply cycles, required for a fetched packet to become available for decoding once it has been fetched.

For the pipeline processor example, the fetch latency can be simulated by performing the VLIW packet fetch in one stage, called the IF ("instruction fetch") stage, and specifying the number of machine cycles required for the IF stage to complete the processing of the VLIW packet fetch. So, for example, a fetch latency of 1 would mean that the fetched VLIW packet would not be available during the current cycle, but would become available during the next cycle. A fetch latency of 2 would mean that the fetched VLIW packet would not be available during the current cycle or the next cycle, but would become available during the cycle after the next cycle, and so forth. For the example used in this application, the fetch latency is set to 1 cycle.

At step 504, then, a VLIW packet fetch is simulated by making available those packets which have been in the packet queue for as long as or longer than the fetch latency, and placing a new VLIW packet in to the packet queue subject to not exceeding the queue length. In the present example, the fetch latency is 1 cycle, so a packet will become available the next cycle after it has been placed in the packet queue. Also, in the present example, the queue length is 2, so no more than 2 VLIW packets can be in the packet queue at the same time. Thus, for the example used in this application, VLIW packet 102 is fetched by placing VLIW packet 102 in the packet queue in the current cycle and making it available for further processing at the next cycle.

At step 506, the fetched VLIW packet is decoded. First, it must be determined if a VLIW packet is available for decoding. Packet availability depends on the fetch latency, as explained above, and also depends on the arrangement of stages in the processor architecture. For the pipeline processor example, the VLIW packet fetch is performed in the IF stage, and the decoding can be performed in one stage, called the ID ("instruction decode") stage. As a first illustration of how packet availability depends on both fetch latency and arrangement of stages, suppose that the ID stage is arranged immediately subsequent to the IF stage.

A fetch latency of 1 cycle means that the VLIW packet is available to the stage immediately subsequent to the IF stage on the next cycle after it is fetched. In this first illustration with a fetch latency of 1 cycle, then, the VLIW packet is available for decoding at the ID stage at the next cycle after it is fetched at the IF stage. A fetch latency of 2 cycles means that the VLIW packet is available to the stage immediately subsequent to the IF stage on the second cycle after it is fetched. In this first illustration with fetch latency equal to 2 cycles, then, the VLIW packet is not available for decoding at the ID stage at the next cycle after it is fetched at the IF stage, and the ID stage must wait another cycle for packet availability before decoding.

As a second illustration of how packet availability depends on both fetch latency and arrangement of stages, suppose that the ID stage is not arranged immediately subsequent to the IF stage and the fetch latency is 1 cycle. In this second illustration, then, the fetched packet is available for decoding before reaching the ID stage, so decoding of the fetched packet at the ID stage must be delayed even though the fetched packet is available. Thus, determining packet availability for decoding is based on fetch latency and arrangement of the pipeline stages. Therefore, the simulation specifies the fetch latency and the stages for packet fetching and decoding.

For the pipeline processor of the present example, the VLIW packet fetch is simulated in the IF stage with a fetch latency of 1 cycle, and the ID stage is arranged immediately subsequent to the IF stage. Thus, in the present example, the VLIW packet 102 is available for decoding at the ID stage at the next cycle after it is fetched at the IF stage. Decoding of VLIW packet 102 proceeds as explained above in connection with FIG. 4. At the end of step 506, then, assembly code associated with execution of the combination of instructions in the VLIW packet is provided.

At step 508, the assembly code associated with execution of the combination of instructions from the decoded packet is used to determine the instruction issue grouping and chaining. In the example used in this application, VLIW packet 102 is decoded, as explained above, as "add r1=r2, r3, 1; (p1) add r4=r5, r6;; add r7=r1, r4 ++;". Also as explained above for the present example, the assembly code associated with execution of the combination of instructions, i.e. the single semicolon at the end of instruction 1, the double semicolon at the end of instruction 2, and the double plus sign and semicolon at the end of instruction 3, indicates that one of the issue groups in VLIW packet 102 consists of only instructions 1 and 2 and no other instructions and that instruction 3 in VLIW packet 102 is chained, i.e. belongs, to an issue group in the next VLIW packet (the next VLIW packet is not shown in any of the Figures).

The instruction grouping and chaining information is used to place instructions into an "instruction window". The instruction window is a queue for storing instructions waiting to be executed. A queue length is specified for the instruction window, referred to as the "instruction window size". In the present example, the instruction window size is set equal to 10, i.e. the instruction window can hold up to 10 instructions. Instructions are placed into the instruction window as they are decoded. Thus, in the present example, if the instruction window does not have space for 3 more instructions, then the decoding portion of the simulation is delayed until enough space becomes available in the instruction window.

Instructions are placed in the instruction window according to their issue groups. Thus, instructions in the same issue group, which are independent as explained above, can be issued from the instruction window at the same time. In the present example, instructions 1 and 2 can be issued together. Instruction 3, which is chained to an issue group in the next VLIW packet, is issued with the instructions from the issue group to which it is chained, i.e. the issue group in the next VLIW packet. Thus, in the present example, instruction 3 would not be issued until after instructions from the next VLIW packet are placed in the instruction window. In step 508, then, individual instructions have been placed in the instruction window so as to be issued according to their issue groups and chaining of instructions to issue groups in subsequent VLIW packets. In other words, the individual instructions are issued according to the assembly code associated with execution of the combination of instructions.

At step 510, execution units are allocated to instructions based on availability of execution units and which instructions are ready to issue from the instruction window. In the present example, both instruction 1 and 2 are instruction type A. As stated above, instruction type A can be executed in execution unit I or execution unit M in the present example. Thus, if any combination of execution units I or M is available, those execution units will be allocated to instructions 1 and 2; that is, individual instructions 1 and 2 will issue. Simulation of the actual issuing behavior depends on the specific VLIW processor description, and the simulation can be performed so as to reflect the specific VLIW processor description. After the allocation of particular execution units to individual instructions, execution of each individual instruction by the assigned execution unit can then be simulated so as to reflect the specific VLIW processor description.

At step 512, it may be desired to continue the simulation for more than one VLIW packet, but not to let the simulation run indefinitely. Therefore, an appropriate condition for ending the simulation is tested, and if the ending condition is not satisfied, the simulation continues at step 504. An appropriate condition, for example, may be whether all the packets in a specified area of memory have been fetched, decoded, issued, and executed. If the ending condition is satisfied, the invention's process for simulating VLIW packets is complete and ends in step 514.

Figure 6:
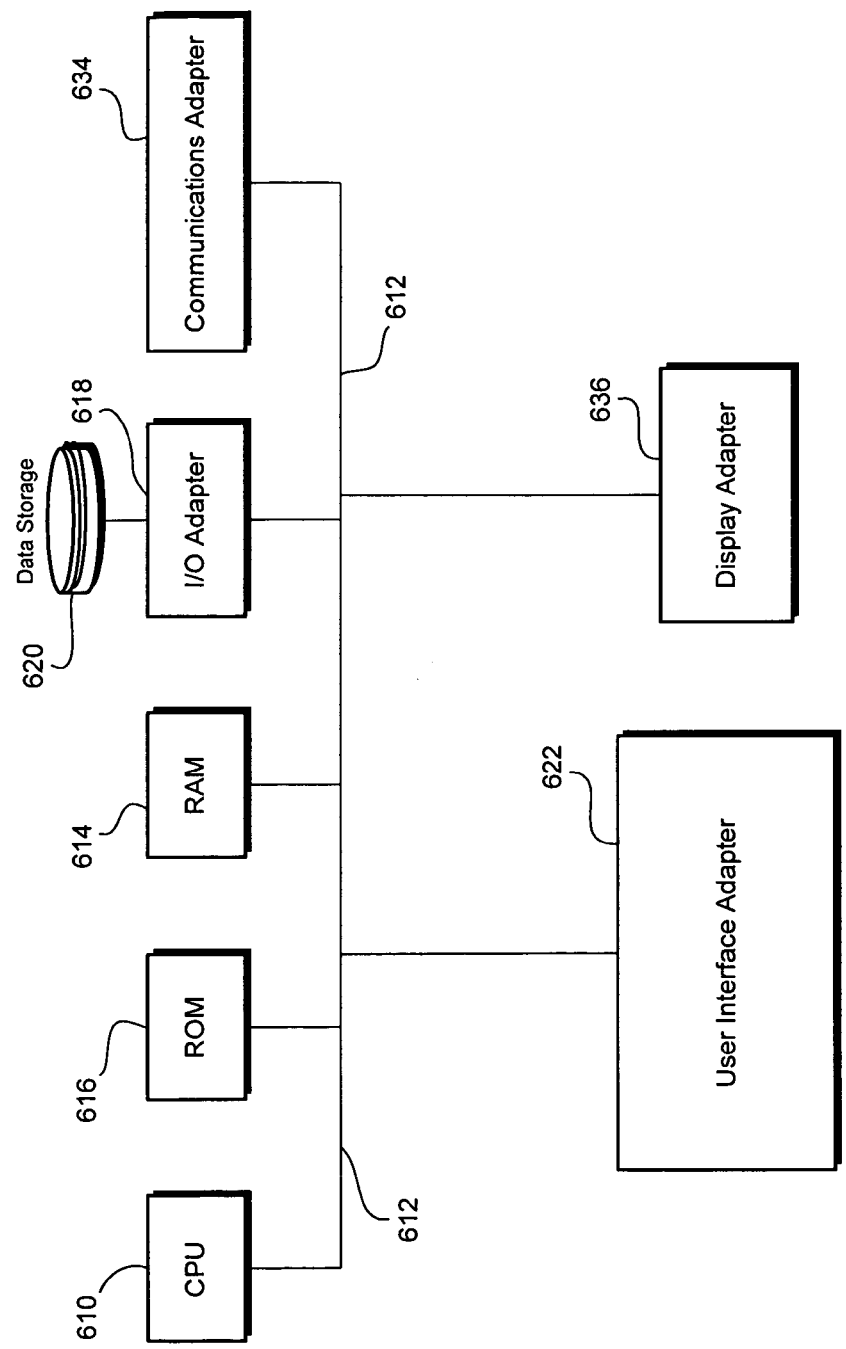
FIG. 6 is an exemplary system which can be used to implement the invention.

As stated above, the invention's approach in encoding, decoding, and simulating a VLIW packet can be implemented utilizing various types of computers and can be written in the RADL ("RADL" is a programming language created at Conexant Systems, Inc., the assignee of the present application). Also, by way of example, a typical computer which can be programmed to run the RADL program code in order to implement the invention to encode VLIW packets, decode VLIW packets and perform related simulations is shown in FIG. 6. The computer programmed to implement the invention is typically part of a system of interconnected computers. Alternatively, the computer shown in FIG. 6 may itself be referred to as a "system" in the present application.

The example computer shown in FIG. 6 comprises a Central Processing Unit (CPU) 610, a Read Only Memory (ROM) 616, a Random Access Memory (RAM) 614, an Input/Output (I/O) Adapter 618, a disk storage (also called a hard drive) 620, a communications adapter 634, a user interface adapter 622, and a display adapter 636. Bus 612 couples CPU 610, ROM 616, RAM 614, I/O Adapter 618, communications adapter 634, user interface adapter 622, and display adapter 636 as shown in FIG. 6. User interface adapter 622 is typically coupled to an input device such as a keyboard (not shown in FIG. 6) to permit a user to communicate with and control the computer. Display adapter 636 is typically coupled to a monitor (not shown in FIG. 6) for the purpose of communicating and interacting with the user.

By way of example, the computer shown in FIG. 6 may be a computer system such as HP® 9000 work station which uses a 32-bit RISC type CPU as CPU 610. However, it is understood and appreciated by those skilled in the art that the invention may also be implemented using a variety of different types of computers other than those specifically mentioned in the present application.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. For example, the template in the VLIW processor may be comprised of a number of consecutive bits located next to each other in a packet, such as template 104 in VLIW packet 102 discussed in the present application. Alternatively, the template may consist of a number of bits that are spread throughout the packet at non-consecutive bit positions. Moreover, while the exemplary VLIW packet referred in the present application referred to a VLIW packet having 128 bits and including three 41-bit instructions, the invention is also applicable to a VLIW packet having 256 bits and consisting of a number of 32-bit or 16-bit instructions.

The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method for encoding and decoding composite VLIW packets and for performing related simulations has been described.

The invention claimed is:

1. A method for decoding a first composite packet in a processor, said method comprising the steps of:

providing assembly code for each one of a plurality of instructions in a first combination of instructions in said first composite packet;

matching a template in said first composite packet to a known template corresponding to one of a plurality of known syntaxes that includes multiple stop bits that indicate an end of an issue group and provide chaining information, wherein said plurality of known syntaxes are arranged as a plurality of first level nodes in a tree structure, wherein each of a plurality of second level nodes in said tree structure includes a combination of instruction types, and wherein each of a plurality of third level nodes in said tree structure includes an instruction type, wherein a plurality of paths extends between node levels and wherein each node of said plurality of first level nodes and said plurality of second level nodes has a path to a node of a different node level;

matching each term in said one of said plurality of known syntaxes against a respective term in a resolved packet syntax using said tree structure, wherein said step of matching said one of said plurality of known syntaxes comprises a sub step of direct matching, followed by a sub step of indirect matching;

using said resolved packet syntax to determine assembly code associated with execution of said first combination of instructions;

providing assembly code associated with execution of said first combination of instructions.

2. The method of claim 1 wherein said assembly code associated with execution of said first combination of instructions specifies at least one issue group for said first combination of instructions.

3. The method of claim 1 wherein said assembly code associated with execution of said first combination of instructions specifies a plurality of issue groups for said first combination of instructions.

4. The method of claim 1 wherein said assembly code associated with execution of said first combination of instructions identifies a chained instruction in said first combination of instructions, wherein said chained instruction belongs to a subsequent issue group in a second composite packet.

5. The method of claim 1 wherein said assembly code associated with execution of said first combination of instructions identifies a plurality of chained instructions in said first combination of instructions, wherein said plurality of chained instructions belong to respective issue groups in a second composite packet.

6. The method of claim 1 wherein said known template identifies at least one issue group in said first composite packet.

7. The method of claim 1 wherein said known template identifies a chained instruction in said first combination of instructions, wherein said chained instruction belongs to a subsequent issue group in a second composite packet.

8. The method of claim 1 wherein said known template identifies a plurality of chained instructions in said first combination of instructions, wherein said plurality of chained instructions belong to respective issue groups in a second composite packet.

9. The method of claim 1 wherein said composite packet in said processor consists of 128 bits.

10. The method of claim 1 wherein said composite packet in said processor consists of 256 bits.

11. The method of claim 1 wherein each instruction in said first combination of instructions consists of 16 bits.

12. The method of claim 1 wherein each instruction in said first combination of instructions consists of 32 bits.

13. The method of claim 1 wherein each instruction in said first combination of instructions consists of 41 bits.

14. The method of claim 1 wherein said first combination of instructions comprises at least two instructions.

15. The method of claim 1 wherein said first combination of instructions comprises at least one issue group.

16. The method of claim 15 wherein said at least one issue group comprises at least one instruction.

17. The method of claim 1 wherein said template comprises at least five bits.

18. The method of claim 1, wherein said instruction type is selected from a group consisting of instruction type A, instruction type I, instruction type M, instruction type F, instruction type B and instruction type LX.

19. The method of claim 1 wherein said step of matching said one of said plurality of known syntaxes matches each said term at one of said plurality of first level nodes in said tree structure.

* * * * *